United States Patent
Lee et al.

(10) Patent No.: US 9,197,430 B2
(45) Date of Patent: Nov. 24, 2015

(54) METHOD FOR RECEIVING MULTICAST SERVICE AND TERMINAL EMPLOYING SAME

(75) Inventors: Eunjong Lee, Anyang-si (KR); Youngsoo Yuk, Anyang-si (KR); Giwon Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 99 days.

(21) Appl. No.: 14/343,724

(22) PCT Filed: Mar. 30, 2012

(86) PCT No.: PCT/KR2012/002423
§ 371 (c)(1),
(2), (4) Date: Mar. 7, 2014

(87) PCT Pub. No.: WO2013/035955
PCT Pub. Date: Mar. 14, 2013

(65) Prior Publication Data
US 2014/0226556 A1    Aug. 14, 2014

Related U.S. Application Data

(60) Provisional application No. 61/532,571, filed on Sep. 9, 2011, provisional application No. 61/551,446, filed on Oct. 26, 2011.

(51) Int. Cl.
*H04L 12/18* (2006.01)
*H04W 4/00* (2009.01)
(Continued)

(52) U.S. Cl.
CPC ............ *H04L 12/189* (2013.01); *H04W 4/005* (2013.01); *H04W 4/06* (2013.01); *H04W 72/005* (2013.01); *H04W 76/002* (2013.01); *H04W 76/021* (2013.01)

(58) Field of Classification Search
CPC .... H04L 12/189; H04W 72/005; H04W 4/06; H04W 4/005; H04W 76/002; H04W 76/021
See application file for complete search history.

(56) References Cited

U.S. PATENT DOCUMENTS 7,519,734 B1 *   4/2009   Dumitriu et al. ............... 709/238
2006/0052096 A1 *  3/2006   Dolgov et al. ............. 455/422.1
(Continued)

FOREIGN PATENT DOCUMENTS

JP   2007-536788 A   12/2007
JP   2011-510590 A   3/2011
(Continued)

OTHER PUBLICATIONS

IEEE C802.16p-11/0187r2; "Releasing MGID through DSD message", Yi-Ting Lin. p. 1-4.
(Continued)

*Primary Examiner* — Brian D Nguyen
(74) *Attorney, Agent, or Firm* — Dentons US LLP

(57) ABSTRACT

Provided are a method for distinguishing different service flows when an M2M terminal transmits/receives data by using an M2M group ID (MGID) in a broadband wireless communication system supporting M2M communication, especially when each of the difference service flows are allocated with MGIDs from different network entities, and a terminal for providing same. According to one embodiment of the present invention, a method for the terminal receiving a multicast service for group terminals from a base station, in a wireless access system, comprises the steps of: receiving from the base station a broadcasting message including at least one identifier, wherein the at least first identifier identifies a group zone that is allocated to the base station; sequentially allocating an index to the at least one first identifier; and receiving from the base station a second identifier for identifying the multicast service and multicast data based on the index.

11 Claims, 3 Drawing Sheets

(51) Int. Cl.
*H04W 4/06* (2009.01)
*H04W 72/00* (2009.01)
*H04W 76/00* (2009.01)
*H04W 76/02* (2009.01)

(56) References Cited

U.S. PATENT DOCUMENTS

| | | | | |
|---|---|---|---|---|
| 2008/0056219 | A1* | 3/2008 | Venkatachalam | 370/342 |
| 2009/0154386 | A1* | 6/2009 | So et al. | 370/311 |
| 2009/0187941 | A1* | 7/2009 | Smith | 725/35 |
| 2011/0038297 | A1* | 2/2011 | Conte et al. | 370/312 |
| 2011/0171989 | A1 | 7/2011 | Kim et al. | |
| 2011/0201344 | A1 | 8/2011 | Ryu et al. | |
| 2011/0292859 | A1* | 12/2011 | So et al. | 370/312 |

FOREIGN PATENT DOCUMENTS

| WO | 2011006437 | 1/2011 |
|---|---|---|
| WO | 2011098993 | 8/2011 |

OTHER PUBLICATIONS

IEEE C802.16p-11/10238r1; "Clarification of MGID domain", Eunjong Lee. p. 1-7.

* cited by examiner

METHOD FOR RECEIVING MULTICAST SERVICE AND TERMINAL EMPLOYING SAME

This application is a 35 USC §371 National Stage entry of International Application No. PCT/KR2012/0002423 filed on Mar. 30, 2012, and claims priority of U.S. Provisional Application Nos. 61/532,571 filed on Sep. 9, 2011 and 61/551,446 filed on Oct. 26, 2011, which are hereby incorporated by reference in its entirety.

TECHNICAL FIELD

The present invention relates to a method for receiving a multicast service and a terminal using the same.

BACKGROUND ART

Machine to Machine (M2M) Communication (Machine Type Communication)

M2M communication will be described below in brief.

As is implied from its appellation, M2M communication is communication between electronic devices, that is, communication between objects. While M2M communication typically refers to wired or wireless communication or communication between a human-controlled device and a machine, it refers particularly to wireless communication between electronic devices, that is, communication between devices. M2M devices are much inferior to general terminals in a cellular network, in terms of performance and capability.

Many terminals are located within a cell and may be categorized according to their types, classes, service types, etc.

For example, terminals may be classified into Human Type Communication (HTC) terminal and Machine Type Communication (MTC) terminal depending on their operation types. MTC may include M2M communication. HTC means signal transmission and reception based on a human decision, whereas MTC means autonomous signal transmission of a terminal without human intervention, which is periodic or event-triggered.

In case of M2M communication, the total number of terminals may be increased rapidly. M2M devices may have the following features according to their supported services:
1. a large number of terminals;
2. a small amount of data;
3. a low transmission frequency (may be periodic);
4. a limited number of data characteristics;
5. not sensitive to time delay; and
6. low mobility or fixed.

M2M communication may find its application in various fields such as protected access and monitoring, tracking and discovery, public safety (in the event of emergency or disaster), payment (a vending machine, a ticket machine, or a parking meter), health care, remote control, smart meter, etc.

Idle Mode

Idle mode is a mechanism of enabling a Mobile Station (MS) to periodically receive a downlink broadcast signal without registering to a specific Base Station (BS) even though the MS roams in a radio link environment where a plurality of BSs are deployed across a wide area.

In idle mode, an MS is just downlink-synchronized to receive a broadcast message, paging message only during a predetermined period, without performing all normal operations as well as HandOver (HO). The paging message indicates a paging action to the MS. For example, paging actions include ranging, network reentry, etc.

The MS or the BS may initiate the idle mode. That is, the MS may enter the idle mode by transmitting a Deregistration Request (DREG-REQ) message to the BS and receives a Deregistration Response (DREG-RSP) message in response to the DREG-REQ message from the BS. Or if the BS transmits a DREG-RSP message or Deregistration Command (DREG-CMD) message to the MS, the MS may enter the idle mode.

Upon receipt of a paging message directed to the MS during an Available Interval (AI) in the idle mode, the MS transitions to connected mode by network entry with the BS and transmits and receives data to and from the BS.

DISCLOSURE

Technical Problem

An object of the present invention devised to solve the problem lies on a method for, when Machine to Machine (M2M) devices transmit and receive data using M2M Group Identifiers (MGIDs), particularly different service flows having MGIDs allocated by different network entities are transmitted in the same area, distinguishing the service flows from each other in a broadband wireless communication system supporting M2M communication.

Technical Solution

The object of the present invention can be achieved by providing a method for receiving a multicast service for a group of terminals from a base station at a terminal in a wireless access system, including receiving a broadcast message including one or more first IDs from the base station, the one or more first IDs identifying group zones allocated to the base station, sequentially allocating indexes to the one or more first IDs, and receiving multicast data from the base station based on a second ID identifying the multicast service and the indexes.

The broadcast message may be a Downlink Channel Descriptor (DCD) message or an Advanced Air Interface System Configuration Descriptor (AAI-SCD) message.

The sequential allocation of indexes may include repeatedly allocating as many indexes as the number of groups zones allocated to the base station to the one or more first IDs.

The number of group zones allocated to the base station may be 4.

The number of group zones allocated to the base station may be acquired from the broadcast message.

The second ID identifying the multicast service may be assigned to the multicast service by Dynamic Service Addition (DSA) after initial network entry.

The one or more first IDs may be M2M group zone IDs and the second ID is an MGID.

The indexes may be specific to the base station.

In another aspect of the present invention, provided herein is a terminal for receiving a multicast service for a group of terminals from a base station in a wireless access system, including a wireless communication unit configured to transmit and receive radio signals externally, and a controller connected to the wireless communication unit. The controller controls the wireless communication unit to receive a broadcast message including one or more first IDs from the base station, the one or more first IDs identifying group zones allocated to the base station, sequentially allocates indexes to the one or more first IDs, and controls the wireless communication unit to receive multicast data from the base station based on a second ID identifying the multicast service and the indexes.

The broadcast message may be a DCD message or an AAI-SCD message.

The controller may repeatedly allocate as many indexes as the number of groups zones allocated to the base station to the one or more first IDs.

Advantageous Effects

According to the present invention, when the same MGID is allocated to different service flows corresponding to different MGID domains, an MS efficiently distinguishes the service flows from each other.

BEST MODE

Embodiments of the present invention described below can be used for various wireless communication systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA), etc. IEEE 802.16m is an evolution of IEEE 802.16e that offers backward compatibility with an IEEE 802.16e-based system. IEEE 802.16p provides a communication standard to support Machine Type Communication (MTC).

UTRA is a part of Universal Mobile Telecommunications System (UMTS). $3^{rd}$ Generation Partnership Project Long Term Evolution (3GPP LTE) is a part of Evolved UMTS (E-UMTS) using E-UTRA. In the 3GPP LTE, OFDMA is used for downlink and SC-FDMA is used for uplink. LTE-Advanced (LTE-A) is an evolution of 3GPP LTE.

While the embodiments of the present invention are described in the context of IEEE 802.16m in order to clarify the technical features of the present invention, the present invention is not limited to IEEE 802.16m.

Figure 1:
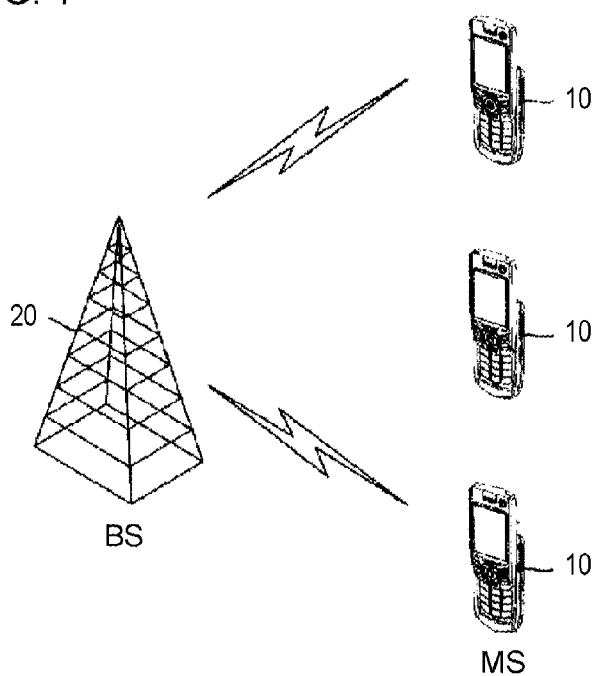
FIG. 1 illustrates a configuration of a wireless communication system.

FIG. 1—Wireless Communication System

FIG. 1 illustrates a configuration of a wireless communication system.

The wireless communication system is deployed over a wide area to provide various communication services including voice, packet data, etc.

Referring to FIG. 1, the wireless communication system includes Mobile Stations (MSs) 10 and a Base Station (BS) 20. The MSs 10 may be fixed or mobile. The term MS may be replaced with other terms such as User Equipment (UE), User Terminal (UT), Subscriber Station (SS), wireless device, Advanced MS (AMS), etc.

The BS 20 is generally a fixed station that communicates with the MSs 10. The term BS may be replaced with other terms such as Node B, Base Transceiver System (BTS), Access Point (AP), etc. One BS 20 may manage one or more cells.

The wireless communication system may operate based on Orthogonal Frequency Division Multiplexing/Orthogonal Frequency Division Multiple Access (OFDM/OFDMA).

OFDM uses a plurality of orthogonal subcarriers and orthogonality between Inverse Fast Fourier Transform (IFFT) and Fast Fourier Transform (FFT). A transmitter IFFT-processes data prior to transmission and a receiver recovers the original data by FFT-processing a received signal. The transmitter uses IFFT to combine multiple subcarriers and the receiver uses FFT to separate the multiple subcarriers from one another.

A slot is a minimum available data allocation unit, defined as a time unit by a subchannel. A subchannel may be configured with a plurality of tiles on an uplink. The subchannel may include 6 tiles and one burst may include 3 OFDM symbols and 1 subchannel on the uplink.

In Partial Usage of Subchannels (PUSC) permutation, each tile may 4 contiguous subcarriers in 3 OFDM symbols. Optionally, each tile may include 3 contiguous subcarriers in 3 OFDM symbols. A bin includes 9 contiguous subcarriers in an OFDM symbol. A band is a group of 4 rows in a bin and an Adaptive Modulation and Coding (AMC) subchannel includes 6 contiguous bins in the same band.

Figure 2:
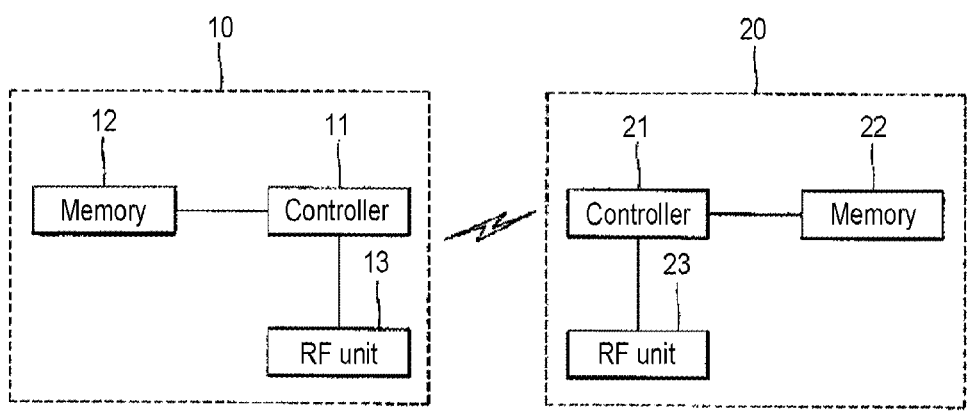
FIG. 2 is a block diagram of a Mobile Station (MS) and a Base Station (BS) in a wireless access system.

FIG. 2—Block Diagram of MS and BS

FIG. 2 is a block diagram of an MS and a BS in a wireless access system.

An MS 10 includes a controller 11, a memory 12, and a Radio Frequency (RF) unit 13.

The MS 10 further includes a display unit, a user interface unit, etc.

The controller 11 implements a proposed function, operation, and/or method. Radio interface protocol layers may be implemented by the controller 11.

The memory 12 is connected to the controller 11 and stores protocols and parameters required for wireless communication. That is, the memory 12 stores an Operating System (OS), an application, and a general file.

The RF unit 13 is connected to the controller 11 and transmits and/or receives a radio signal.

In addition, the display unit displays information of the MS and may be configured with a known element such as a Liquid Crystal Display (LCD), an Organic Light Emitting Diode (OLED), etc. The user interface unit may be configured by combining known user interfaces such as a keypad or a touch screen.

The BS 20 includes a controller 21, a memory 22, and an RF unit 23.

The controller 21 implements a proposed function, operation, and/or method. Radio interface protocol layers may be implemented by the controller 21.

The memory 22 is connected to the controller 21 and stores protocols and parameters required for wireless communication.

The RF unit 23 is connected to the controller 21 and transmits and/or receives a radio signal.

The controllers 11 and 21 may include Application-Specific Integrated Circuits (ASICs), other chip sets, logic circuits, and/or data processors. The memories 12 and 22 may include a Read Only Memory (ROM), a Random Access Memory (RAM), a flash memory, a memory card, a storage medium, and/or other storages. The RF units 13 and 23 may include a baseband circuit for processing a radio signal. If an embodiment of the present invention is configured in software, the above-described scheme may be implemented in the form of modules (operations, functions, etc.). The modules may be stored in the memories 12 and 22 and executed by the processors 11 and 21.

The memories 12 and 22 may be inside or outside the controllers 11 and 21 and may be connected to the controllers 11 and 21 by various known means.

Figure 3:
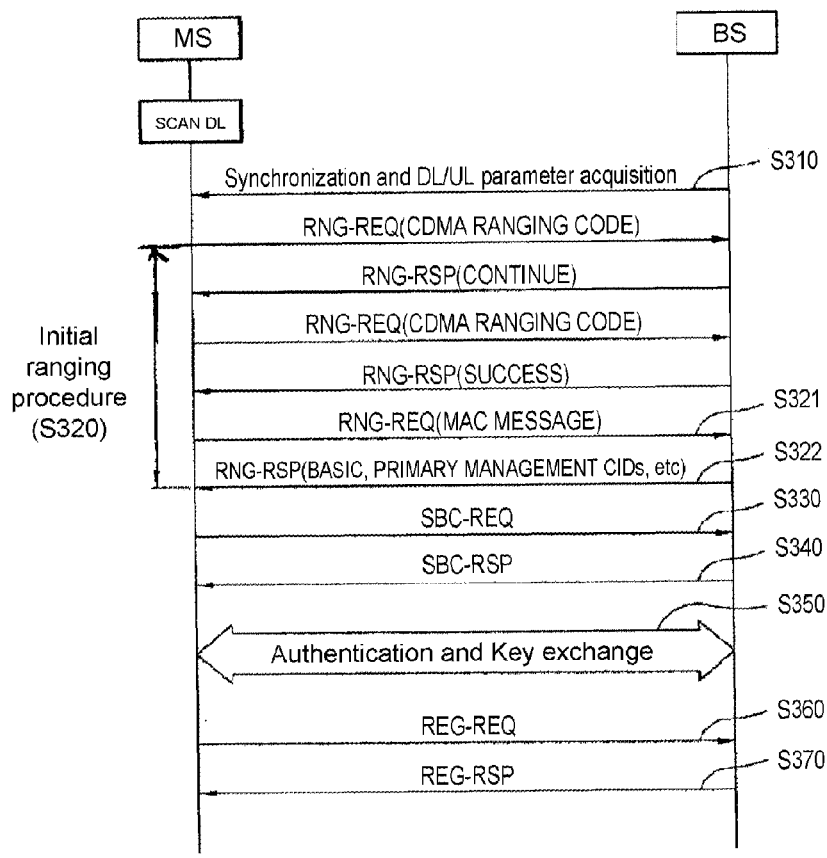
FIG. 3 is a diagram illustrating a signal flow for an initial access method in a wireless communication system.

FIG. 3—Initial Access Method

FIG. 3 is a diagram illustrating a signal flow for an initial access method in a wireless communication system.

Referring to FIG. 3, the MS 10 is powered on and searches for a connectable BS by scanning downlink channels, for initial access. Because the MS 10 does not have knowledge of a network topology or a network configuration at first, the MS 10 scans the frequencies of neighbor BSs one by one.

After the MS 10 completes all system settings by acquiring downlink and uplink system information from the detected BS 20 (S310), the MS performs a ranging procedure with the BS 20 as illustrated in FIG. 3. The MS selects a random CDMA ranging code and performs ranging with the BS in a contention-based manner by transmitting the random CDMA ranging code, thus acquiring uplink synchronization (S320).

Until the synchronization is completed, the BS transmits parameters with which the MS is supposed to make an adjustment to the MS by a Ranging Response (RNG-RSP) message. While the MS makes an adjustment based on the parameters, the status of the RNG-RSP message is set to 'continue'. Upon completion of the parameter adjustment, the BS transmits an RNG-RSP message with status set to 'success'.

The RNG-RSP message that the BS transmits to the MS includes power offset information, timing offset information, and data transmission and reception frequency offset information for the MS calculated based on the ranging request code received from the MS by the BS. The MS transmits data to the BS based on the information.

After confirming that the ranging code-based ranging request has been accepted successfully by the RNG-RSP message, the MS transmits a Ranging Request (RNG-REQ) message to the BS (S321) and the BS replies to the MS with an RNG-RSP message (S322).

Upon receipt of the RNG-RSP message, the MS transmits, to the BS, a Subscriber station Basic Capability Request (SBC-REQ) message including various parameters and information about an authentication scheme that are supported for data transmission and reception to and from the BS by the MS (S330).

Upon receipt of the SBC-REQ message from the MS, the BS compares the MS-supported parameters and authentication scheme indicated by the SBC-REQ message with BS-supported parameters and authentication scheme. Then the BS determines parameters and an authentication scheme for use in data transmission and reception between the MS and the BS and transmits a Subscriber station Basic Capability Response (SBC-RSP) message including the parameters and information about the authentication scheme to the MS (S340).

After the MS performs basic capability negotiation with the BS, the MS performs an authentication procedure with the BS. That is, the MS and the BS authenticate each other and exchanges authorization keys (S350).

Subsequently, the MS registers to the BS by exchanging a Registration Request (REG-REQ) message and a Registration Response (REG-RSP) message with the BS (S360 and S370).

After the MS registers to the BS, an Internet Protocol (IP) connection is established, a time of day is set, and other operation parameters are transmitted. Thus, the connection is completely set up between the MS and the BS.

M2M Communication

M2M communication will be described below in brief.

As is implied from its appellation, M2M communication is communication between electronic devices, that is, communication between objects. While M2M communication typically refers to wired or wireless communication or communication between a human-controlled device and a machine, it refers particularly to wireless communication between electronic devices, that is, communication between devices. M2M devices are much inferior to general terminals in a cellular network, in terms of performance and capability.

An M2M communication environment is characterized by 1. a large number of terminals in a cell;
2. a small amount of data;
3. a low transmission frequency;
4. a limited number of data characteristics; and
5. not sensitive to time delay.

Many terminals are located within a cell and may be categorized according to their types, classes, service types, etc. Particularly, if M2M communication or MTC is considered, the total number of terminals may be increased rapidly. M2M devices may have the following features according to their supported services.

1. An M2M device transmits data intermittently. The data transmission may be periodic.
2. An M2M device has low mobility or is fixed.
3. An M2M device is not sensitive to transmission latency.

Many M2M devices having the above features in a cell may transmit or receive signals to and from other M2M devices or a BS through a multi-hop configuration or a hierarchical structure among the M2M devices.

That is, an M2M device may receive a signal from the BS and transit the signal to another M2M device in a different layer or a lower layer. Or the M2M device may receive a signal from another M2M device and transmit the received signal to a third M2M device or the BS. Or M2M devices may directly communicate with each other without relaying.

For signal transmission between M2M devices in a broad sense, the M2M devices are interconnected hierarchically, for signal transmission (although hierarchy may not be applied to direct communication between M2M devices, the direct communication between M2M devices may also be described in the context of hierarchy).

From the perspective of downlink transmission, for example, MS 1 receives a signal from a BS and transmits the received signal to MS 2. MS 1 may transmit the signal to a lower-layer MS as well as to MS 2. Herein, MS 2 is an MS under MS 1.

MS 2 transmits the signal received from MS 1 to a lower-layer MS and in the same manner, to MS N. Many MSs may be connected over multiple hops or hierarchically between MS 2 and MS N.

In another example, from the perspective of uplink transmission, a signal may be transmitted between M2M devices as follows. A lower-layer M2M device may transmit a signal to another M2M device or a BS through a higher-layer M2M device.

Terms used in an M2M system are given as follows.

(1) M2M communication: information exchange between User Equipments (UEs) through a BS or between a server of a core network and a device through a BS, without human intervention.

(2) M2M Access Service Network (ASN): an access service network that can support an M2M service.

(3) M2M device: a terminal having (or supporting) an M2M function.

(4) M2M subscriber: a consumer of the M2M service.

(5) M2M server: an entity that can communicate with an M2M device. The M2M server provides an interface for providing connectivity to an M2M subscriber.

(6) M2M feature: A unique characteristic of an M2M application supported by the M2M ASN. One or more features may be needed to support the application.

(7) M2M group: a group of M2M devices including a common and/or the same M2M subscriber, that is, sharing one or more features.

While the following description is given in the context of an IEEE 802.16 system (particularly, an IEEE 802.16m system), the present invention is not limited to the specific system. Rather, it is to be clearly understood that the present invention is also applicable to other systems such as LTE, LTE-A, etc.

M2M Group ID (MGID), MGID Zone ID, and M2M Device ID (MDID)

In accordance with embodiments of the present invention, an M2M device may belong to one or more M2M groups. An M2M group is a group of M2M devices sharing one or more features. For example, the M2M group may be a set of MSs that receive a specific application service. An MGID is assigned to each M2M group. An MGID identifies a specific M2M group solely in a network entity. The network entity may be, for example, an M2M server.

The network entity assigns MGIDs. An MGID may be assigned to a service flow of an M2M device by Dynamic Service Addition (DSA) or any other process after initial network entry. Unless the M2M device moves out of the network or the network deletes the service flow associated with the MGID, the MGID is maintained for the M2M device. The MGID may be changed by Dynamic Service Change (DSC).

In an M2M communication system, each M2M device is assigned an MGID identifying an M2M group to which the M2M device belongs and an MDID identifying the M2M device in the M2M group.

An MGID is an ID used to identify an M2M group in a cell and an MDID is an ID used to identify an M2M device in an M2M group.

During initial network entry, an M2M communication system assigns an MGID and an MDID to an M2M device, for communication with a BS. The M2M communication system refers to a BS or a network entity connected to a network. The network entity may be, for example, an M2M server.

An M2M group zone ID identifies a network entity that assigns an MGID. One M2M group may include one or more BSs and one BS may belong to one or more M2M groups. A service flow to MGID mapping relationship is the same in one M2M group and may be different between different M2M groups. MGIDs may be managed individually in each group zone having a different M2M group zone ID. Accordingly, the same MGID may be assigned to different service flows in an area where groups zones are overlapped. Now a description will be given of a method for distinguishing service flows from each other by an MS in the above situation.

Figure 4:
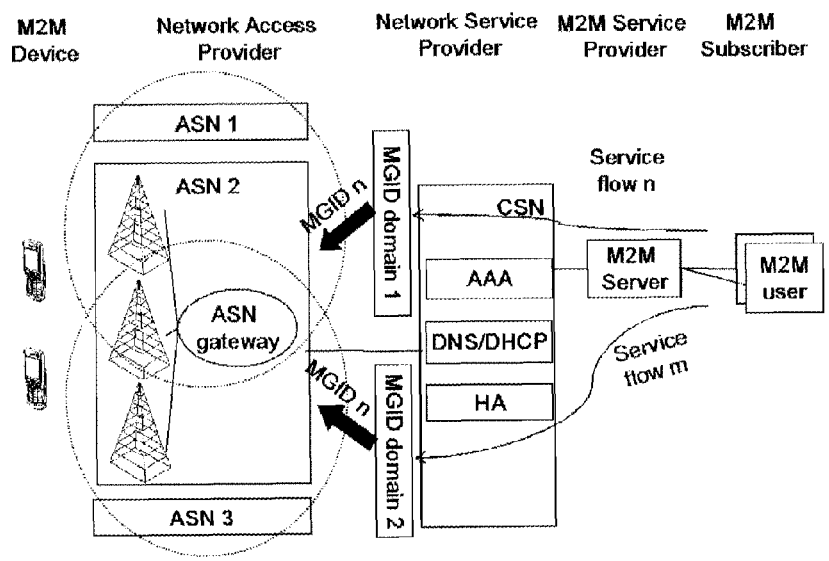
FIG. 4 conceptually illustrates an Machine to Machine (M2M) Group Identifier (ID) (MGID) domain.

FIG. 4—Conceptual View

FIG. 4 illustrates the concept of an MGID domain.

According to the related art, the definition of an MGID domain (i.e. group zone) is not specified. Therefore, different MGID domains may be overlapped and the same MGID may be assigned to different service flows in an area such as ASN2 illustrated in FIG. 4. Although data generated from different service flows should be distinguished by different MGIDs, the data cannot be distinguished in the related art.

A method for indicating an MGID in different MGID domains during transmission of multicast data will be described below.

Method 1

In Method 1, an MGID domain ID as well as an MGID is distinguished in a DL-MAP indicating an area carrying a multicast message.

Figure 5:
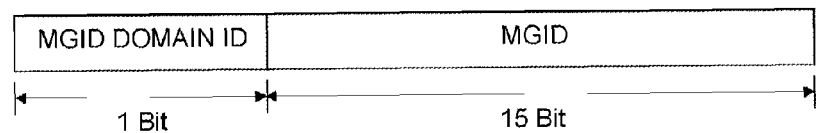
FIG. 5 illustrates a structure of an MGID frame in a Downlink MAP (DL-MAP) according to an embodiment of the present disclosure.

FIG. 5 illustrates a structure of an MGID frame in a DL-MAP according to an embodiment of the present disclosure.

An MGID is recognized by blind decoding through 16-bit Cyclic Redundancy Check (CRC) masking. Since an MGID is defined to include 16 bits, an extra 1-bit space remains. Two different MGID domains may be distinguished from each other using the 1 bit. If three or more MGID domains overlap with one another, a field indicating an MGID domain ID may be added to the DL-MAP.

Method 2

In Method 2, time is divided such that multicast data from different MGID domains are transmitted in predetermined frames (subframes).

To distinguish multicast data transmitted from different MGID domains, the multicast data is transmitted in predetermined frames or subframes. An MS should have prior knowledge of a frame or subframe carrying multicast data from each MGID domain.

Equation 1 and Equation 2 determine the position of a frame or subframe according to an MGID domain ID.

$$\text{MGID domain ID } \%4 = \text{number of frame carrying multicast data} (1 \text{superframe} = 4 \text{frames}) \qquad \text{Equation 1}$$

$$\text{MGID domain ID } \%(4*\text{number of DL subframes}) = \text{number of frame carrying multicast data} \qquad \text{Equation 2}$$

(4*number of DL subframes=number of all DL subframes in superframe)

A BS may indicate the position of a specific frame (or subframe) along with an MGID domain ID to an MS in an MGID allocation message (e.g., DSA-REQ/RSP) by explicit signaling.

Method 3

In Method 3, even though an MS that receives data by an MGID is placed in connected mode, the MS receives each paging message and if the paging message wakes up the MS by an MGID, the paging message always carries an MGID domain ID.

Figure 6:
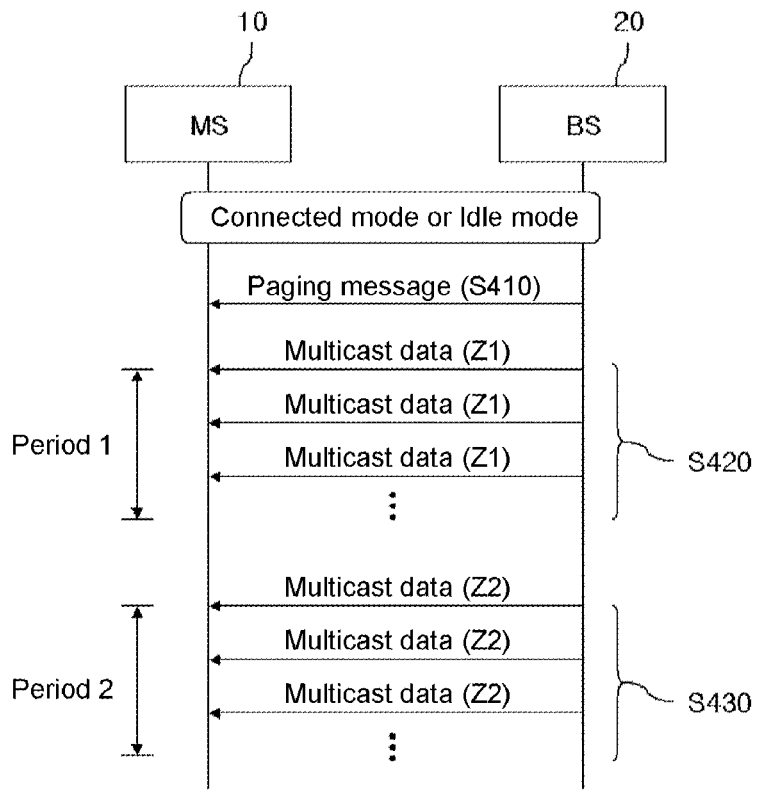
FIG. 6 is a diagram illustrating a signal flow for an operation for transmitting multicast data according to an embodiment of the present disclosure.

FIG. 6 is a diagram illustrating a signal flow for an operation for transmitting multicast data according to an embodiment of the present disclosure.

If MSs belonging to the same M2M group are woken up by an MGID in a paging message, it may not mean that the MSs of the M2M group are all in idle mode. Since some MSs may be in the connected mode and other MSs may be in the idle mode, it should be indicated that multicast data is transmitted first to the idle-mode MSs in order to transmit the same multicast message to all MSs of the M2M group.

Even though an MS is in the connected mode, the MS may recognize a paging message with an MGID assigned to the MS. Accordingly, MSs of a specific M2M group including even a connected-mode MS receive multicast data after checking a paging message, rather than a BS indicates an MGID domain ID only in the paging message (S410).

Multicast data for the same MGID from different MGID domain IDs may be transmitted at different time points by BS scheduling. That is, the BS transmits multicast data corresponding to a first MGID domain ID to an MS during a first time period (S420) and multicast data corresponding to a second MGID domain ID to the MS during a second time period (S430).

Method 4

In Method 4, the number of MGID Zone IDs in Method 2 is set to n.

Figure 7:
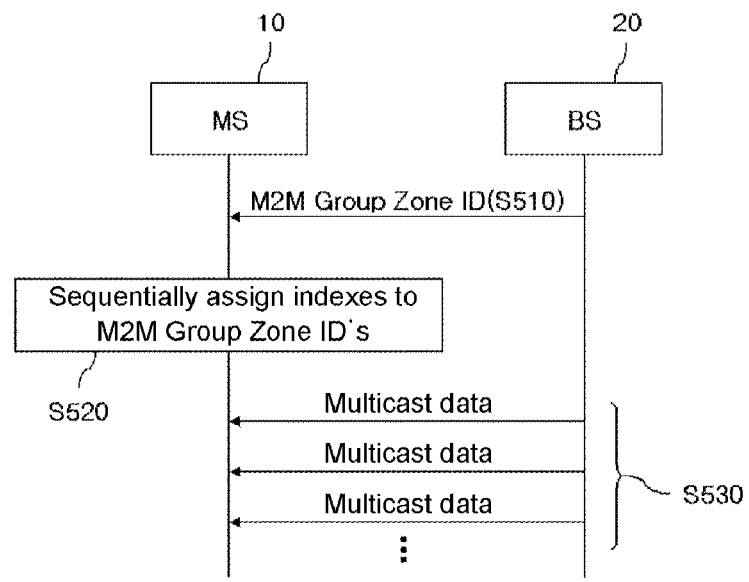
FIG. 7 is a diagram illustrating a signal flow for an operation for transmitting multicast data according to another embodiment of the present disclosure.

FIG. 7 is a diagram illustrating a signal flow for an operation for transmitting multicast data according to another embodiment of the present disclosure.

MGID Zone IDs are transmitted in a broadcast message such as a DL Channel Descriptor (DCD) or a System Configuration Descriptor (SCD) and an MS may determine how many MGID Zone IDs a BS has based on the broadcast message (S510).

The MS indexes BS MGID Zone IDs of the MGID Zone IDs indicated by the DCD or SCD with 0 to n−1 (S520). For example, the lowest MGID Zone ID is 0, the second lowest MGID Zone ID is 1, and the highest MGID Zone ID is n−1.

Therefore, the MS may sequentially index as many group zones as the number of group zones allocated to the BS. As described before in Method 2, the number of group zones allocated to the BS may be 4. Indexes may be assigned uniquely to each BS.

The MS receives multicast data from the BS using the indexes assigned in step S520 and an MGID assigned by the BS (S530). Herein, the MS may determine a frame or subframe carrying multicast data for an MGID Zone ID by computations described in Method 2.

That is, the following Equation 3 and Equation 4 determine the position of a frame or a subframe according to an MGID domain ID.

MGID domain ID % $n$=number of frame carrying multicast data(1superframe=n frames)   Equation 3

MGID domain ID %($n$*number of DL subframes)= number of frame carrying multicast data   Equation 4

($n$*number of DL subframes=number of all DL subframes in superframe)

The BS may indicate the position of a specific frame (or subframe) along with an MGID domain ID to the MS in an MGID allocation message (e.g., DSA-REQ/RSP) by explicit signaling.

Method 5

In Method 5, an M2M Group Zone ID is transmitted in a Medium Access Control (MAC) header.

If a BS has one or more M2M Group Zone IDs, the BS uses a MAC header to indicate an M2M Group Zone ID for which a specific MGID has been assigned.

An M2M Group Zone ID associated with an MGID for transmission data may be transmitted in an M2M Group Zone ID Extended Header. [Table 1] below illustrates a format of the M2M Group Zone ID Extended Header.

TABLE 1

| Syntax | Size (bits) | Notes |
|---|---|---|
| MZIDEH(){ | | |
| Type | 4 | Extended header type = 0bxxxx(M2M GROUP ZONE IDEH type) |
| M2M GROUP ZONE ID | TBD | M2M GROUP ZONE ID for MGID of data transmission in this MAC PDU |
| } | | |

An MS receives data having the M2M Group Zone ID Extended Header. If an M2M Group Zone ID indicated by the M2M Group Zone ID Extended Header is not associated with a current MGID of the MS, the MS ignores the data. Only when the M2M Group Zone ID indicated by the M2M Group Zone ID Extended Header is associated with the current MGID of the MS, the MS transmits the data to a higher layer.

In the case of an IEEE 802.16e-based M2M device, extended subheader types may be newly defined and used in the above manner.

In the case of an LTE-based M2M device, an If an M2M Group Zone ID control element may be newly defined for a MAC header or Packet Data Convergence Protocol (PDCP) header and used in the above manner.

If M2M Group Zones are overlapped, when a BS assigns (re-assigns) an MGID to an MS, the BS should indicate a zone to which a corresponding MGID is specific to the MS. That is, when assigning (re-assigning) an MGID in a DSA, DSC, Paging Advertisement (PAG-ADV), or RNG-RSP message, the BS should transmit an M2M Group Zone ID as well as the MGID.

Only when the BS has one or more M2M Group Zone IDs, an M2M Group Zone ID may be transmitted. If an M2M Group Zone ID is not transmitted, the MS may refer to the M2M Group Zone ID of the BS that allocates the current MGID. That is, the MS may refer to a value transmitted in an Advanced Air Interface System Configuration Descriptor (AAI-SCD), DCD, or any other message.

The technical terms used herein are provided simply to describe specific embodiments, not intended to restrict the present invention. Unless otherwise defined, all the terms used herein including technical terms have the same meanings as terms generally understood by those skilled in the art. Unless definitely defined herein, the terms should not be interpreted as excessively comprehensive or excessively narrow meanings. If terms used herein are wrong technical terms that do not accurately describe the subject matter of the present invention, the terms should be interpreted by replacing them with proper technical terms understandable to those skilled in the art. In addition, terms defined in a general dictionary should be understood so as to have the same meanings as contextual meanings of the related art.

Herein, singular expressions include plural expressions unless otherwise clarified in the context. In this description, the term 'include' or 'have' is not interpreted as necessarily including all of the features, numbers, steps, operations, components, parts, or a combination thereof described in the specification. Rather, it should be understood that there are possibilities of omitting or adding one or more features, numbers, steps, operations, components, parts, or combinations thereof.

While ordinal numbers like first, second, etc. can be used to describe a number of components, these components are not limited by the terms. The terms are used to distinguish one component from other components. For example, a first component may be referred to as a second component or vice versa within the scope and spirit of the present invention.

If it is said that a component is 'connected' to or 'contacts' another component, the components may be connected to each other or may contact each other, directly or a third component may exist between the components. On the other hand, if it is said that a component is 'directly connected' to or 'directly contacts' another component, the components may be connected to each other or may contact each other, without a third component in between.

Preferred embodiments of the present invention have been described in detail with reference to the attached drawings. Like reference numerals denote the same or similar components and redundant descriptions of the components are avoided. In addition, descriptions of well-known functions and constructions may be omitted lest they should obscure the subject matter of the present invention. The accompanying drawings are provided to assist in a comprehensive understanding of embodiments of the invention, not limiting the present invention. Accordingly, those of ordinary skill in the art will recognize that the subject matter of the present invention is extended to all modifications, equivalents, and replacements as well as the attached drawings without departing from the scope and spirit of the invention.

The invention claimed is:

1. A method for receiving a multicast service for a group of terminals from a base station at a terminal in a wireless access system, the method comprising:
    receiving a broadcast message including one or more first identifiers (IDs) from the base station, the one or more first IDs identifying group zones allocated to the base station;
    sequentially allocating indexes to the one or more first IDs; and
    receiving multicast data from the base station based on a second ID identifying the multicast service and the indexes.

2. The method according to claim 1, wherein the broadcast message is a Downlink Channel Descriptor (DCD) message or an Advanced Air Interface System Configuration Descriptor (AAI-SCD) message.

3. The method according to claim 1, wherein the sequential allocation of indexes comprises repeatedly allocating as many indexes as the number of groups zones allocated to the base station to the one or more first IDs.

4. The method according to claim 3, wherein the number of group zones allocated to the base station is 4.

5. The method according to claim 3, wherein the number of group zones allocated to the base station is acquired from the broadcast message.

6. The method according to claim 1, wherein the second ID identifying the multicast service is assigned to the multicast service by Dynamic Service Addition (DSA) after initial network entry.

7. The method according to claim 1, wherein the one or more first IDs are Machine to Machine (M2M) group zone IDs and the second ID is an M2M Group ID (MGID).

8. The method according to claim 1, wherein the indexes are specific to the base station.

9. A terminal for receiving a multicast service for a group of terminals from a base station in a wireless access system, the terminal comprising:
    a wireless communication unit configured to transmit and receive radio signals externally; and
    a controller connected to the wireless communication unit, wherein the controller controls the wireless communication unit to receive a broadcast message including one or more first Identifiers (IDs) from the base station, the one or more first IDs identifying group zones allocated to the base station, sequentially allocates indexes to the one or more first IDs, and controls the wireless communication unit to receive multicast data from the base station based on a second ID identifying the multicast service and the indexes.

10. The terminal according to claim 9, wherein the broadcast message is a Downlink Channel Descriptor (DCD) message or an Advanced Air Interface System Configuration Descriptor (AAI-SCD) message.

11. The terminal according to claim 9, wherein the controller repeatedly allocates as many indexes as the number of groups zones allocated to the base station to the one or more first IDs.

* * * * *